United States Patent
Okita

(10) Patent No.: US 8,520,109 B2
(45) Date of Patent: Aug. 27, 2013

(54) SOLID-STATE IMAGE PICKUP APPARATUS AND IMAGE PICKUP SYSTEM

(75) Inventor: Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 13/217,024

(22) Filed: Aug. 24, 2011

(65) Prior Publication Data

US 2012/0050594 A1 Mar. 1, 2012

(30) Foreign Application Priority Data

Aug. 30, 2010 (JP) ................................ 2010-192439

(51) Int. Cl.
*H04N 3/14* (2006.01)
*H04N 5/335* (2011.01)

(52) U.S. Cl.
USPC .......................................... 348/308; 348/294

(58) Field of Classification Search
USPC ......................................... 348/294, 302, 308
See application file for complete search history.

(56) References Cited

FOREIGN PATENT DOCUMENTS

JP 9-46596 A 2/1997

*Primary Examiner* — Gevell Selby
(74) *Attorney, Agent, or Firm* — Canon U.S.A., Inc. IP Division

(57) ABSTRACT

In a first reset period, electrons on a floating node shared by conversion elements are reset by a sequence of reset voltages before electrons in the first conversion element are transferred to the floating node for common use. In a second reset period, electrons on the floating node are reset by a first reset voltage after the electrons in the first photoelectric conversion element are transferred to the floating node and before electrons in the second photoelectric conversion element are transferred to the floating node. The first and the second reset periods are different in length. The first reset period includes a sub-period in which resetting is performed by a highest reset voltage of the plurality of reset voltages, and the second reset period includes a sub-period in which resetting is performed by the first reset voltage, wherein these two sub-periods are substantially equal in length.

20 Claims, 8 Drawing Sheets

SOLID-STATE IMAGE PICKUP APPARATUS AND IMAGE PICKUP SYSTEM

BACKGROUND OF THE INVENTION

1. Field of the Invention

The present invention relates to solid-state image pickup apparatus and an image pickup system.

2. Description of the Related Art

In recent years, a great advance has been made in technology associated with a CMOS-type solid-state image pickup apparatus. In the CMOS-type solid-state image pickup apparatus, each pixel thereof includes a photodiode, a floating diffusion (hereinafter referred to as FD) region that converts an electric charge transferred via a transfer transistor into a voltage signal, an amplifier, and a reset transistor that resets the FD region. The CMOS-type solid-state image pickup apparatus tends to increase in the number of pixels and decrease in pixel size every year. To meet this tendency, Japanese Patent Laid-Open No. 9-46596 discloses a technique in which transfer transistors are provided for respective photodiodes and electric charges generated by the photodiodes are transferred to one FD region. This technique allows a reduction in the number of amplification transistors and the number of reset transistors per pixel, and thus allows an increase in the area size for the photodiode.

A further description is given below as to the technique disclosed in Japanese Patent Laid-Open No. 9-46596 in which electric charges generated in a plurality of photodiodes are transferred to a shared FD region. In a case where one FD region is shared by two photodiodes, the FD region is first reset when the reset transistor is turned on. Note that the resetting is continued as long as the reset transistor is in the on-state. At a time at which a signal is to be read out from a first photodiode, the reset transistor is turned off, and a transfer transistor connected to the first photodiode is turned on to transfer the signal charge to the FD region. Thereafter, the reset transistor is again turned on to reset the FD region. After the resetting, the reset transistor turns off. The transfer transistor connected to the second photodiode is then turned on to transfer the signal charge to the FD region. The process described above is performed repeatedly to read signals from all pixels.

In the technique disclosed in Japanese Patent Laid-Open No. 9-46596, at a time immediately before the electric charge of the first photodiode is transferred, the potential of the FD region is equal to the FD potential obtained after the reset transistor has remained in the on-state for a long period. On the other hand, the potential of the FD region given at a time immediately before the electric charge of the second photodiode is transferred is equal to the FD potential obtained after the reset transistor has remained in the on-state for a short period after the charge transfer of the first photodiode is complete.

Thus, a difference between the two FD potentials occurs for reasons described below. In the solid-state image pickup apparatus, with increasing signal reading rate, the reading time per pixel decreases. More specifically, for example, the reset time immediately before the signal charge is transferred from the second photodiode is as short as a few μsec or shorter. As a result, the reset time before the signal is read from the second photodiode is shorter than the reset time before the signal is read from the first photodiode. Thus, the reset operation is ended before complete resetting is achieved. Therefore, a difference occurs between two photodiodes in terms of reset potential in a state immediately before the reading is performed. This difference results in a difference in image output, which results in a problem that a reduction in image quality occurs.

SUMMARY OF THE INVENTION

One possible method to deal with the above problem is to maintain the reset transistor in the off-state during a period before the reading from the first photodiode is performed, and turn on the reset transistor immediately before the end of the resetting. However, in this method, if the FD region has a junction leakage, a large change in potential of the FD region occurs during a period in which the electric charge is accumulated in the photodiode, which can produce a change in the FD potential compared with that immediately before the reading of the second photodiode is performed. Furthermore, when light with high intensity is incident on the pixel, a change can also occur in potential of the FD region, which can produce a change in the FD potential compared with that immediately before the reading of the second photodiode is performed. Thus, this method does not provide a good solution for the problem.

In view of the above, the present invention provides a solid-state image pickup apparatus and an image pickup system configured so as to reduce a difference in output among photoelectric conversion elements sharing one floating node thereby allowing it to take a high-quality image.

The solid-state image pickup apparatus configured in the below-described manner is thus capable of suppressing the difference in reset voltage of the floating node in the state immediately before the electric charge is transferred from each photoelectric conversion element thereby reducing the difference in output between photoelectric conversion elements that share the floating node whereby it becomes possible to take a high-quality image.

In an aspect, the present invention provides a solid-state image pickup apparatus including a first conversion element configured to generate a first electron by photoelectric conversion, a second conversion element configured to generate a second electron by photoelectric conversion, a floating node for common use, a first transistor configured to transfer the first electron to the floating node, a second transistor configured to transfer the second electron to the floating node, and a reset transistor configured to reset the electron on the floating node for common use. The solid-state image pickup apparatus has a first reset period in which the electron on the floating node is reset sequentially by a plurality of reset voltages before the first electron is transferred to the floating node, and a second reset period in which the second electron on the floating node is reset by a first reset voltage after the first electron is transferred to the floating node and before the second electron is transferred to the floating node. The first reset period and the second reset period are different in length. The first reset period includes a first sub-period in which resetting is performed by a highest reset voltage of the plurality of reset voltages, and the second reset period includes a second sub-period in which resetting is performed by the first reset voltage, wherein these two sub-periods are substantially equal in length.

Further features of the present invention will become apparent from the following description of exemplary embodiments with reference to the attached drawings.

DESCRIPTION OF THE EMBODIMENTS

Embodiments of the present invention are described below with reference to the accompanying drawings. In the embodiments described below, by way of example, it is assumed that electrons are used to provide signal charges. Note that the present invention may also be applied to a case in which holes are used to provide signal charges. In this case, PMOS transistors may be used as transfer transistors, and voltage polarities are inverted.

First Embodiment

Figure 1:
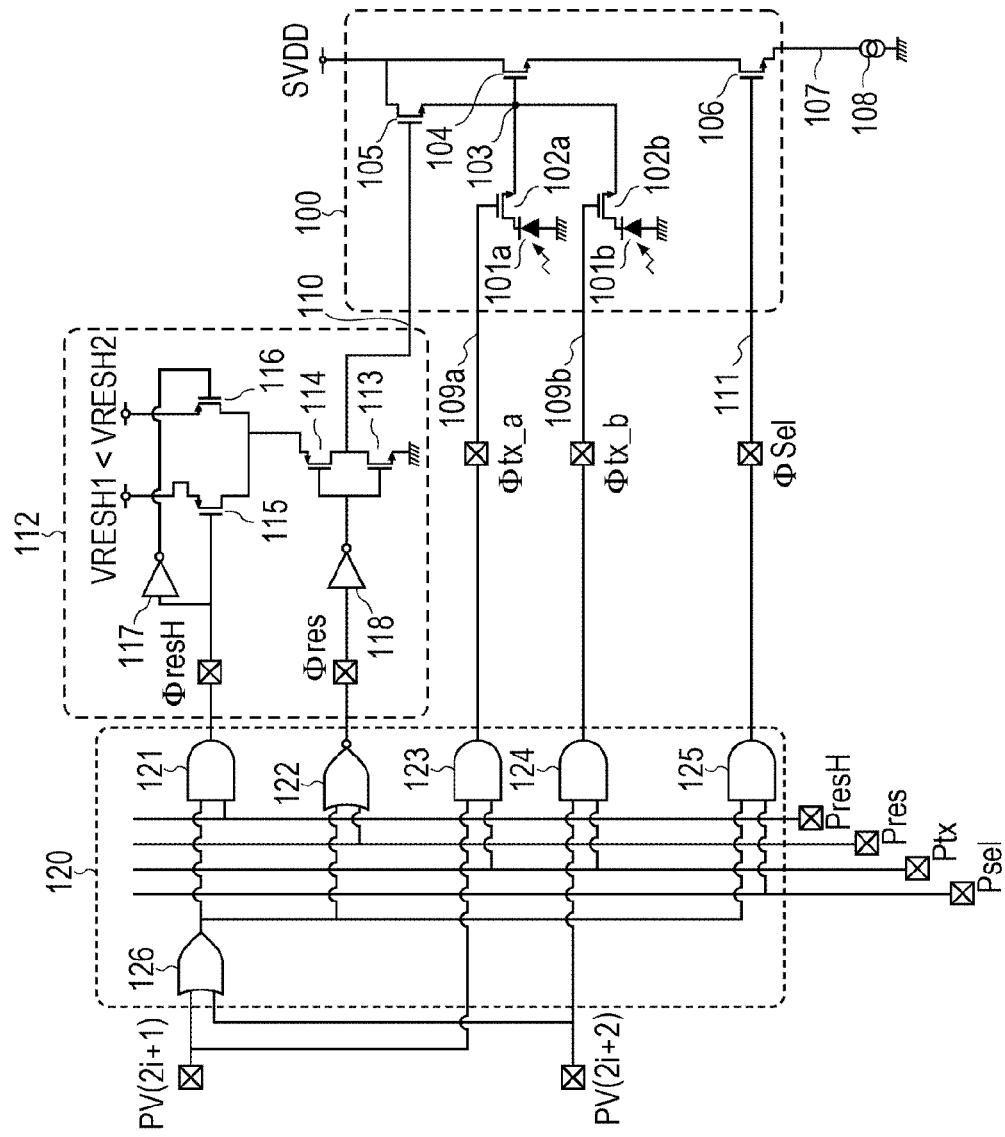
FIG. 1 illustrates a pixel circuit of a solid-state image pickup apparatus according to an embodiment of the present invention.

FIG. 1 illustrates a pixel circuit of a solid-state image pickup apparatus according to a first embodiment of the present invention. A pixel unit 100 includes two photodiodes 101a and 101b, transfer transistors 102a and 102b, a floating node 103 for common use, an amplification MOS transistor 104, a reset transistor 105, and a selection transistor 106. The floating node for common use 103 may be configured by one floating diffusion region (FD region) or by two floating diffusion regions connected to each other via an electrically conductive material. Hereinafter, the floating node for common use 103 is assumed to be realized by an FD region, and the floating node for common use 103 will be referred to as the FD region 103.

The transfer transistors 102a and 102b transfer electric charges from the photodiodes 101a and 101b, respectively. The photodiodes 101a and 101b are used as photoelectric conversion elements. The photoelectric conversion elements are not limited to the photodiodes, but other types of photoelectric conversion elements may be used as long as they are capable of generating electric charges (electrons) corresponding to incident light by photoelectric conversion. The first photodiode 101a functions as the first photoelectric conversion element, while the second photodiode 101b functions as the second photoelectric conversion element. The FD region 103 is an FD region that is shared by the photodiodes 101a and 101b and that can be connected to the photodiodes 101a and 101b to hold electric charges generated by the photodiodes 101a and 101b. The first transfer transistor 102a is connected to the first photodiode 101a such that the electric charge generated by the first photodiode 101a can be transferred to the FD region 103. The second transfer transistor 102b is connected to the second photodiode 101b such that the electric charge generated by the second photodiode 101b can be transferred to the FD region 103. The reset transistor 105 resets the electric charge in the FD region 103. The FD region 103 is electrically connected to a gate of an amplification MOS transistor 104. The amplification MOS transistor 104 forms a part of a source follower amplifier to output a signal corresponding to the amount of the signal charge transferred to the FD region 103. The gate of the amplification MOS transistor 104 functions as an input node of the source follower amplifier. The amplification MOS transistor 104 may be operated under conditions such that gate voltage<drain voltage (i.e., in a pentode mode). A power supply voltage SVDD resets the FD region 103 via the reset transistor 105.

In the present embodiment, the drain of the amplification MOS transistor 104 and the drain of the reset transistor 105 are both supplied with the same power supply voltage SVDD. A selection transistor 106 selects a row to be output. The output node of the amplification MOS transistor 104 is connected to a vertical read line 107 via the selection transistor 106. The vertical read line 107 is connected to a constant current source 108. The amplification MOS transistor 104 and the constant current source 108 form a source follower amplifier. The gates of the transfer transistors 102a and 102b, the reset transistor 105, and the selection transistor 106 are respectively connected to transfer transistor driving lines 109a and 109b, a reset transistor driving line 110, and a selection transistor driving line 111.

The reset transistor driving line 110 is driven by an output from a reset voltage supply circuit 112. The reset voltage supply circuit 112 is configured to supply two different high levels for resetting. For example, the reset voltage supply circuit 112 may be realized using a circuit shown in FIG. 1. The reset voltage supply circuit 112 includes an NMOS transistor 113, PMOS transistors 114, 115, and 116, and inverters 117 and 118. When an input ΦresH of the inverter 117 is at a low-level potential and an input Φres of the inverter 118 is at a high-level potential, the PMOS transistors 114 and 115 turn on and thus a potential of VRESH1 is supplied to the reset transistor driving line 110. When the input ΦresH of the inverter 117 is at the low-level potential and the input Φres of the inverter 118 is at the high-level potential, the PMOS transistors 114 and 116 turn on and thus a potential of VRESH2 is supplied to the reset transistor driving line 110.

The potential levels are set such that 0<VRESH1<VRESH2. The potential VRESH1 is selected such that when the potential VRESH1 is supplied to the reset transistor 105, the potential VRESH1 can cause the reset transistor 105 to turn on. When the input Φres of the inverter 118 is at the low level, the NMOS transistor 113 turns on and thus ground potential is supplied to the reset transistor driving line 110. At this timing, driving pulses are supplied from a pulse selector 120 to the pixel unit 100 and the reset voltage supply circuit 112. In the pulse selector 120, a logic operation is performed between signals PV(2i+1) and PV(2i+2) supplied from a shift register and driving signals Psel, Ptx, Pres, and PresH given from the outside, and necessary pulses determined based on the result of the logic operation are supplied to various terminals. For example, the pulse selector 120 includes AND circuits 121, 123, 124, and 125, an OR circuit 126, and a NOR circuit 122.

Figure 2:
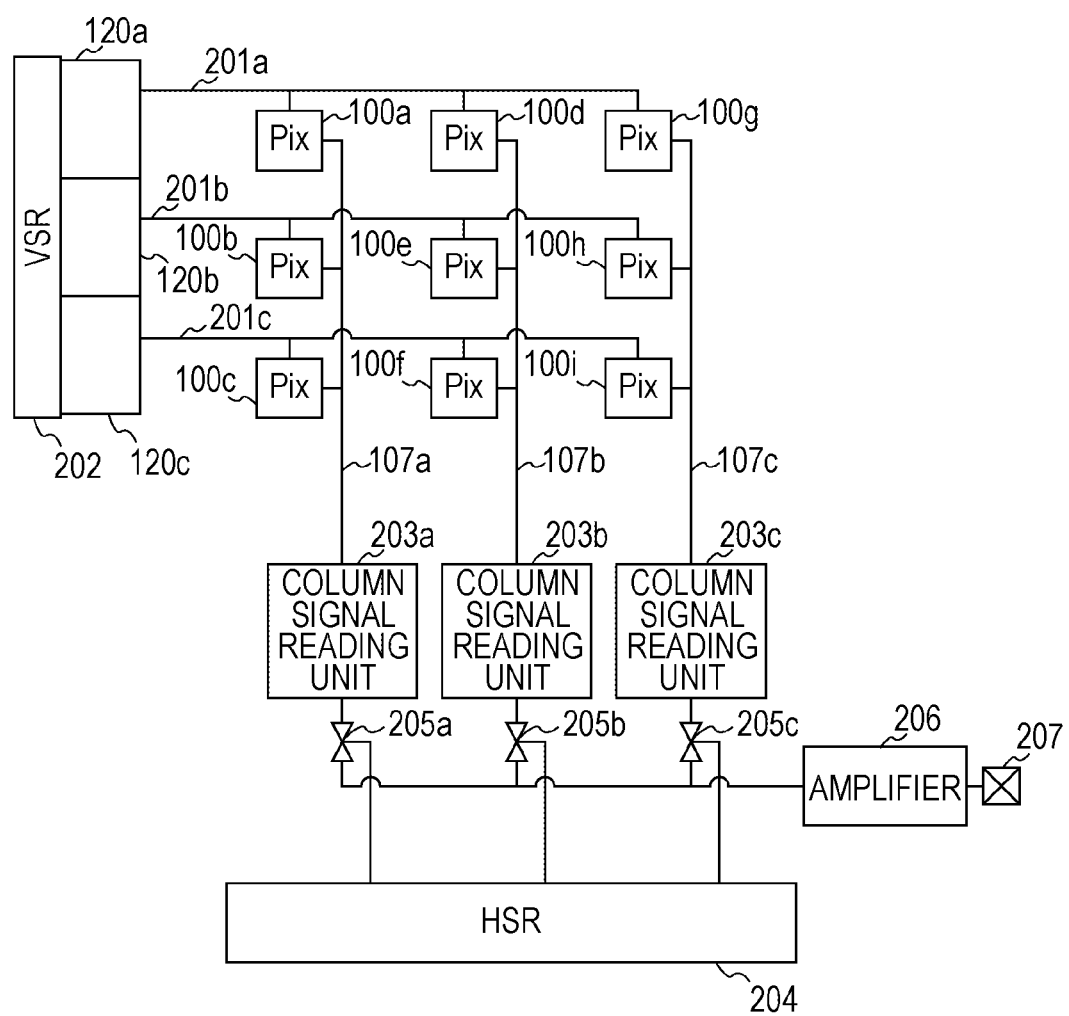
FIG. 2 is a block diagram illustrating a total configuration of a solid-state image pickup apparatus according to an embodiment of the present invention.

FIG. 2 is a block diagram illustrating a general configuration of a solid-state image pickup apparatus using the pixel circuit shown in FIG. 1. In FIG. 2, pixel units 100a to 100i are each similar in configuration to the pixel unit 100 shown in FIG. 1. In the example shown in FIG. 2, the solid-state image pickup apparatus includes pixel units arranged in an array with 3 rows and 3 columns. However, the solid-state image pickup apparatus may be configured in different manners as long as a plurality of pixel units is arranged in the form of a one-dimensional or two-dimensional array. In FIG. 2, pixel signals of the pixel units 100a to 100i are read out via vertical read lines 107a, 107b, and 107c. The pixel units are driven by horizontal driving lines 201a, 201b, and 201c such that the pixel signals are read out on a row by row basis. Note that each of the horizontal driving lines 201a, 201b, and 201c includes four lines corresponding to the driving lines 109a, 109b, 110, and 111 shown in FIG. 1, although these four driving lines are denoted by one line in FIG. 2 for simplicity of illustration. A vertical shift register (VSR) 220 and pulse selectors 120a, 120b, 120c, each similar to the pulse selector 120 shown in FIG. 1, are blocks that sequentially select the horizontal driving lines 201a to 201c and drive the selected line. Column signal reading units 203a, 203b, and 203c process the signals from the pixel units 100a to 100i. A horizontal shift register (HSR) 204 generates control signals to sequentially read the pixel signals held in the column signal reading units 203a, 203b, and 203c. The pixel signals are sequentially transferred to an amplifier 206 when switches 205a, 205b, and 205c are sequentially turned on. The pixel signals are amplified by the amplifier 206 and output from an output terminal 207.

Figure 3:
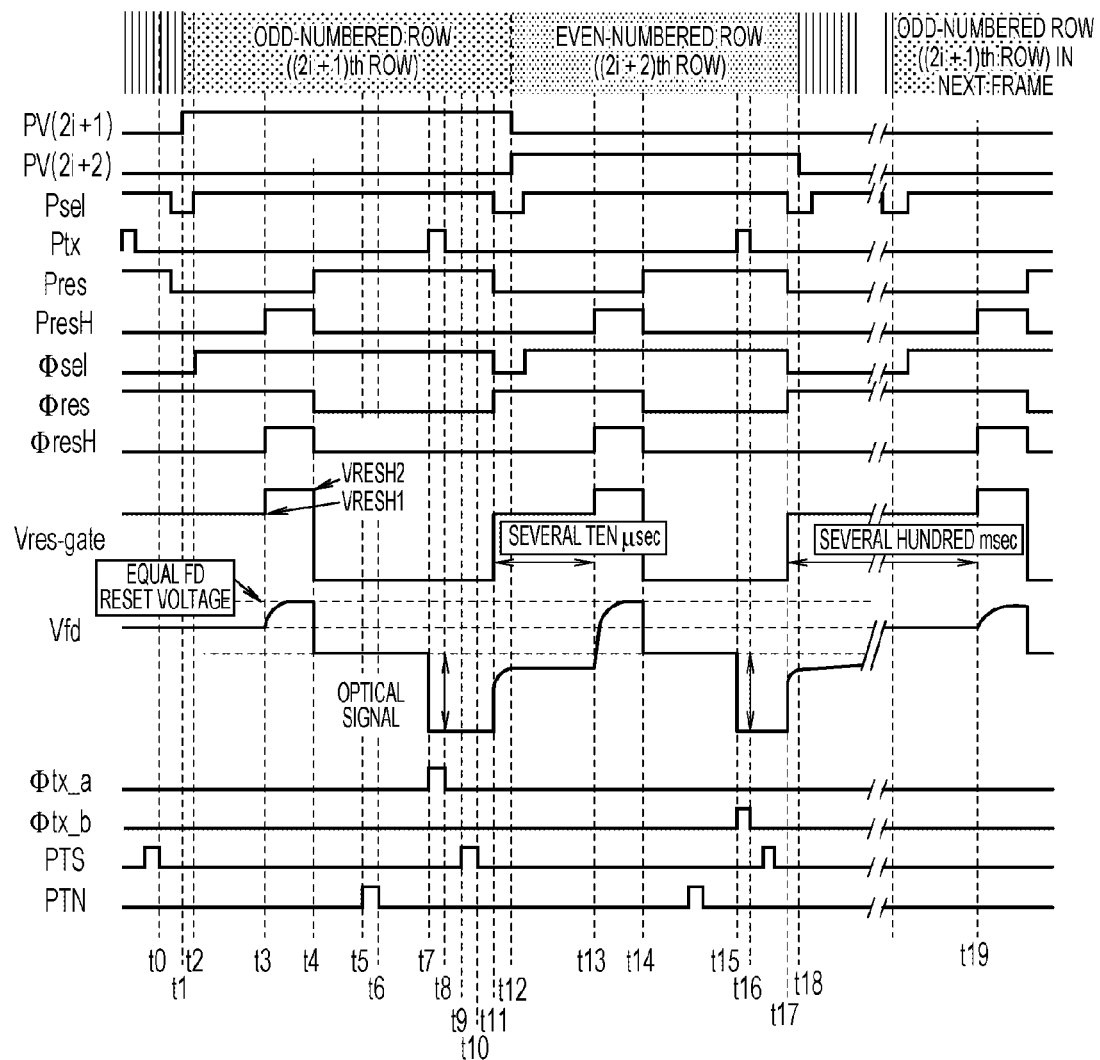
FIG. 3 is a driving timing chart associated with a solid-state image pickup apparatus according to an embodiment of the present invention.

FIG. 3 is a timing chart associated with a driving operation of the circuit shown in FIG. 1 and FIG. 2. In FIG. 3, potential states of main interconnection lines in FIG. 1 are also shown. In FIG. 3, PV(2i+1) and PV(2i+2) denote selection pulses that are supplied from a vertical shift register 202 to read out the electric charge of the photodiode 101a in an odd-numbered row and the electric charge of the photodiode 101b in an even-numbered row, respectively. Note that the timing chart shown in FIG. 3 illustrates timings of reading out signals from photodiodes in the adjacent odd-numbered and even-numbered rows in a particular frame period and a starting part of a next frame period. Note that FIG. 3 also illustrates a change in gate potential (Vres-gate) of the reset transistor 105 and a change in potential Vfd of the FD region 103 caused by the change in Vres-gate. At time t0 at which the (2i+1)th and (2i+2)th rows are not yet selected, driving lines and the circuit are in the following states. Φsel (driving line 111) is at the low level and the selection transistor 106 of the pixel unit 100 is in the off-state. Φres is at the high level and the ΦresH is at the low level. The potential VRESH1 is supplied to the gate of the reset transistor 105 (via the driving line 110) whereby the gate potential Vres-gate of the reset transistor 105 is set to be equal to VRESH1. As a result, the potential Vfd of the FD region 103 is reset to be nearly equal to VRESH1.

At time t1, a signal PV(2i+1) from the vertical shift register 202 switches to the high level and thus the driving pulse signals are enabled.

When both Psel and Φsel switch to the high level at time t2, the selection transistor 106 turns on and it is enabled to output the signal from the pixel unit 100.

When PresH switches to the high level at time t3, ΦresH switches to the high level, and thus a potential VRESH2 is supplied to the gate of the reset transistor 105 (via the driving line 110) whereby the gate potential Vres-gate of the reset transistor 105 is set to equal to VRESH2. Because VRESH1<VRESH2, the potential Vfd of the FD region 103 reaches a higher value.

At time t4, Pres switches to the high level and PresH switches to the low level, and thus Φres switches to the low level. As a result, the resetting of the FD region 103 is ended, which causes the FD region 103 to be brought into a state in which when the gate potential of the reset transistor 105 changes from VRESH2 to the ground potential, the potential Vfd is swung down via capacitive coupling. At this timing, ΦresH switches to the low level and a potential corresponding to the potential Vfd is output to the vertical read line 107.

In a period from t5 to t6, PTN supplied to the column signal reading unit 203 switches to the high level at t5 and returns to the low level at t6, and in this period from t5 and t6, a dark-level signal is sampled by the column signal reading unit 203.

In a period from t7 to t8, Ptx switches to the high level at t7 and returns to the low level at t8, and, in response, the transfer transistor 102a of Φtx_a turns on at t7 and turns off at t8. As a result, in this period, the optical signal in the odd-numbered row is transferred to the FD region 103, and thus the potential Vfd drops down.

In a period from t9 to t10, PTS supplied to the column signal reading unit 203 switches to the high level at t9 and returns to the low level at t10, and thus in the period a light signal is sampled by the column signal reading unit 203.

At time t11, Pres switches to the low level, and thus Φres switches to the high level. In response, the gate potential Vres-gate of the reset transistor 105 switches from the grand potential to VRESH1, and the potential Vfd is reset.

At time t11+Δt, i.e., immediately after time t11, the potential Vfd is given by the following equation:

$$Vfd(t11+\Delta t)=VRESH1-Vth$$

where Vth is a threshold voltage of the reset transistor 105.

Thereafter, a sub-threshold current of the reset transistor 105 causes the potential Vfd to gradually increase. The sub-threshold current depends on a gate-source voltage difference Vgs of the reset transistor 105 such that the sub-threshold current increases exponentially with Vgs. Because the gate potential is given by Vg=VRESH1 and the source potential Vs is given by Vs=Vfd, and thus:

$$Vgs=VRESH1-Vfd$$

$$I \propto EXP(VRESH1-Vfd)$$

Thus, when the potential difference between Vfd and VRESH1, a great sub-threshold current occurs. Thereafter, when Vfd approaches VRESH1, the current decreases exponentially. However, in a very long time, a current gradually flows into the FD region 103 and the potential of Vfd gradually increases.

At time t12, the signal PV(2i+1) from the vertical shift register 202 switches to the low level and the signal PV(2i+2) switches to the high level. As a result, the driving pulse 109a of the transfer transistor in the odd-numbered row is disabled and, instead, the driving pulse 109b of the transfer transistor in the even-numbered row is enabled.

The following operation is performed in a similar manner to that performed in the period from t2 to t11, and thus the following description will focus on differences. Time t13 corresponds to time t3 for the odd-numbered row. The operation at time t13 is similar to that at time t3 in that similar driving pulses are used but the operations are different in that the potential Vfd has different values. This is because, as described above, in the even-numbered row, Vfd is reset in a short period of a few is to a few ten μs similar in length to a period from t11 to t13 in which one row is read out, while in the odd-numbered row, in contrast, the resetting of the FD region 103 is performed over a long period of a few ten ms to a few hundred msec which is similar in length to one frame period.

In the present embodiment, in addition to VRESH1, VRESH2 higher than VRESH1 is provided as a potential to reset the FD region 103. Although the period in which VRESH1 is applied to the reset transistor 105 is different between the odd-numbered row and the even-numbered row, the period in which VRESH2 is applied to the reset transistor 105 is substantially equal for the odd-numbered row and the even-numbered row. Thus, it is possible to obtain the same potential of the FD region 103 for the odd-numbered row and the even-numbered row at a point of time (t4 or t14) at which the resetting is ended.

By using the potential VRFSH2 higher than VRESH1 in the resetting, it becomes possible to suppress the potential difference of the FD region 103 by passing a great sub-threshold current in the even-numbered row in which the source potential Vfd of the reset transistor 105 is lower than that in the odd-numbered row. The length of the period t3 to t4 and the period t13 to t14 in which VRESH2 is applied may be preferably set to 10 ns to 10 µs and more preferably to 100 ns to 2 µs. The length of the period from t13 to t14 may be set to be substantially equal to that of the period from t3 to t4, or the length of the period from t13 to t14 may be set to be greater than that of the period from t3 to t4. By setting the resetting period to be slightly longer for the even-numbered row than for the odd-numbered row, it becomes possible to ensure that the potential of the FD region 103 is more likely to be equal for the even-numbered row and the odd-numbered row. That is, the large difference in FD potential created by the large difference in resetting time of VRESH1 can be compensated for by a small difference in resetting time of VRESH2. The difference in the resetting time may be set preferably to be equal to or less than 100 ns and more preferably equal to or less than 10 ns.

The potential difference between VRESH1 and VRESH2 may be set preferably to be equal to or greater than 100 mV. More preferably, the potential difference may be set to be equal to or greater than 1 V, because a greater resetting voltage results in a greater sub-threshold current. Note that the initial value of Vfd determined by VRESH1 determines the source potential, while VRESH2 determines the gate potential, and thus a greater difference between VRESH1 and VRESH2 results in a greater difference between the gate potential and the source potential. The applied potentials may be higher than the drain potential of the reset transistor 105, because a higher reset potential can result in a greater sub-threshold current.

Referring again to FIG. 3, in a period from t15 to t16, Ptx switches to the high level at t15 and returns to the low level at t16. In response, the transfer transistor 102b of Φtx_b turns on at t15 and turns off at t16. As a result, in this period, optical signals of even-numbered row are transferred to the FD region 103, and thus the potential Vfd drops down. In a following period, as in the odd-numbered row, PTS supplied to the column signal reading unit 203 switches to the high level and then returns to the low level, and thus a light signal is sampled by the column signal reading unit 203.

At time t17, Pres switches to the low level, and thus Φres switches to the high level. In response, the gate potential Vres-gate of the reset transistor 105 switches from the grand potential to VRESH1, and the potential Vfd is reset. Thereafter, at time t18, the signal PV(2i+2) from the vertical shift register 202 switches to the low level and thus the driving pulse signals are disabled. However, because the signal Φres is at the high level, the FD region 103 is further maintained in the resetting state. This pixel unit 100 is not selected and thus is not released from the resetting state until time t19 at which a next frame of the image is processed. Therefore, the FD region 103 in the odd-numbered row is continuously maintained in the resetting state over a period of about a few ten ms to a few hundred ms. In this very long period, the potential of the FD region 103 gradually increases. At time t19 or t3 until which only VRESH1 has been continuously applied, the FD potential is higher than that at a similar time (t13) in the even-numbered row.

As described above, the reset transistor 105 sequentially resets the charge in the FD region 103 by the plurality of reset voltages in the first reset period (which ends at time t4). Thereafter, in a period from t7 to t8, the first transfer transistor 102a transfers the electric charge generated by the first photodiode 101a to the FD region 103. Thereafter, in the second reset period (from time t11 to time t14) different from the first reset period, the reset transistor 105 sequentially resets the charge in the FD region 103 by the plurality of reset voltages (including the first reset voltage). Thereafter, in a period from t15 to t16, the second transfer transistor 102b transfers the electric charge generated by the second photodiode 101b to the FD region 103. Note that the first reset period and the second reset period are different in length.

More specifically, the reset transistor 105 sequentially provides a plurality of gate potentials (VRESH1 and VRESH2 in the present example) such that the resetting is performed sequentially by the plurality of reset voltages. Preferably, a difference is set to be greater than or equal to 100 mV between a highest potential and a next highest potential of the plurality of gate potentials (VRESH1 and VRESH2) supplied to the reset transistor 105.

Note that the period from t3 to t4 is a sub-period of the first reset period, and in this sub-period from t3 to t4, the reset transistor 105 performs the resetting operation using the highest reset voltage of the plurality of reset voltages. The period from t13 to t14 is a sub-period of the second reset period, and in this sub-period from t13 to t14, the resetting operation is performed using the highest reset voltage of the plurality of reset voltages (including the first reset voltage). The period from t3 to t4 and the period from t13 to t14 are substantially equal in length. In the present invention, the term "substantially equal" is used to express that the two periods are equal to each other or the difference between them is less than or equal to 100 ns. The period from t3 to t4 and the period from t13 to t14 are preferably set to be within a range from 10 ns to 10 µs. The second reset period includes a sub-period in which the FD region 103 is reset by a second reset voltage lower than the first reset voltage.

As described above, in the pixel unit 100 including the FD region 103 shared by the plurality of photodiodes, there are provided two reset voltages, i.e., VRESH1 and VRESH2 higher than VRESH1, and the resetting time of the resetting by VRESH2 is set to be substantially equal for the even-numbered row and the odd-numbered row such that the potential of the FD region 103 after the resetting becomes equal for the even-numbered row and the odd-numbered row thereby making it possible to achieve a high-quality image with no difference in output between the even-numbered row and the odd-numbered row. If the first gate potential VRESH1 is lower than the second gate potential VRESH2, to achieve the advantages of the present embodiment, it is important to apply the voltages in the order first gate potential VRESH1 and second gate potential VRESH2. In the example described above, there are provided two values for the reset voltage. However, three or more values may be provided, and the period in which the resetting is performed using the highest value may be set to be equal for the plurality of photodiodes.

Second Embodiment

Figure 4:
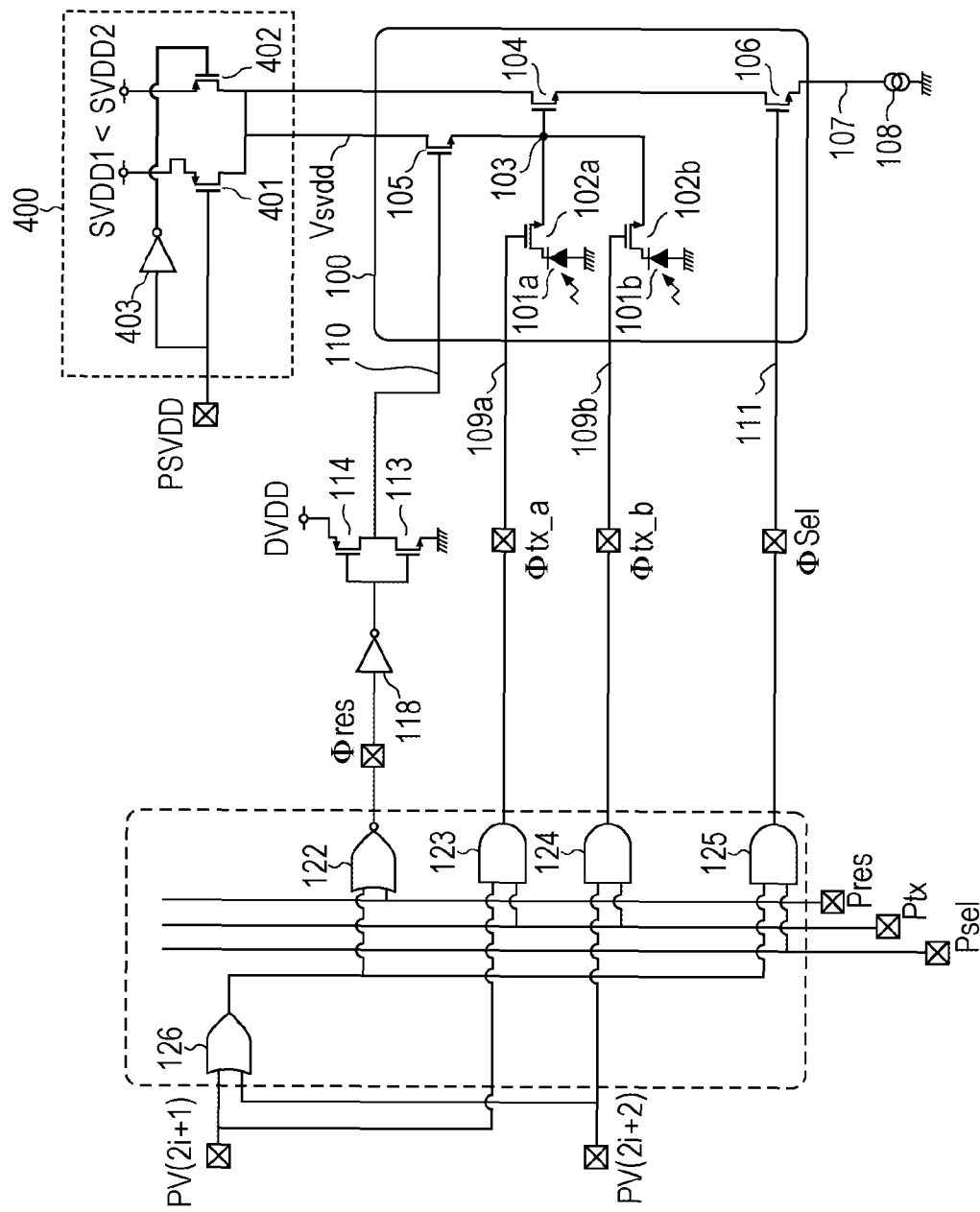
FIG. 4 illustrates a pixel circuit of a solid-state image pickup apparatus according to an embodiment of the present invention.

FIG. 4 illustrates a pixel circuit of a solid-state image pickup apparatus according to a second embodiment of the present invention. In the following description of the second embodiment, an explanation of similar parts to those according to th first embodiment is omitted, and the following description will focus on differences. In the present embodiment, drains in the pixel unit 100 are connected to a pixel power supply switch circuit 400 and the pixel power supply is switched between SVDD1 and SVDD2. Note that the pixel power supply switch circuit 400 is provided in this embodiment instead of the reset voltage supply circuit 112 in the previous embodiment. In this configuration, the pulse PresH is not necessary, and, instead, a driving pulse PSVDD is used. As shown in FIG. 4, the pixel power supply switch circuit 400 includes PMOS transistors 401 and 402 and an inverter 403.

Figure 5:
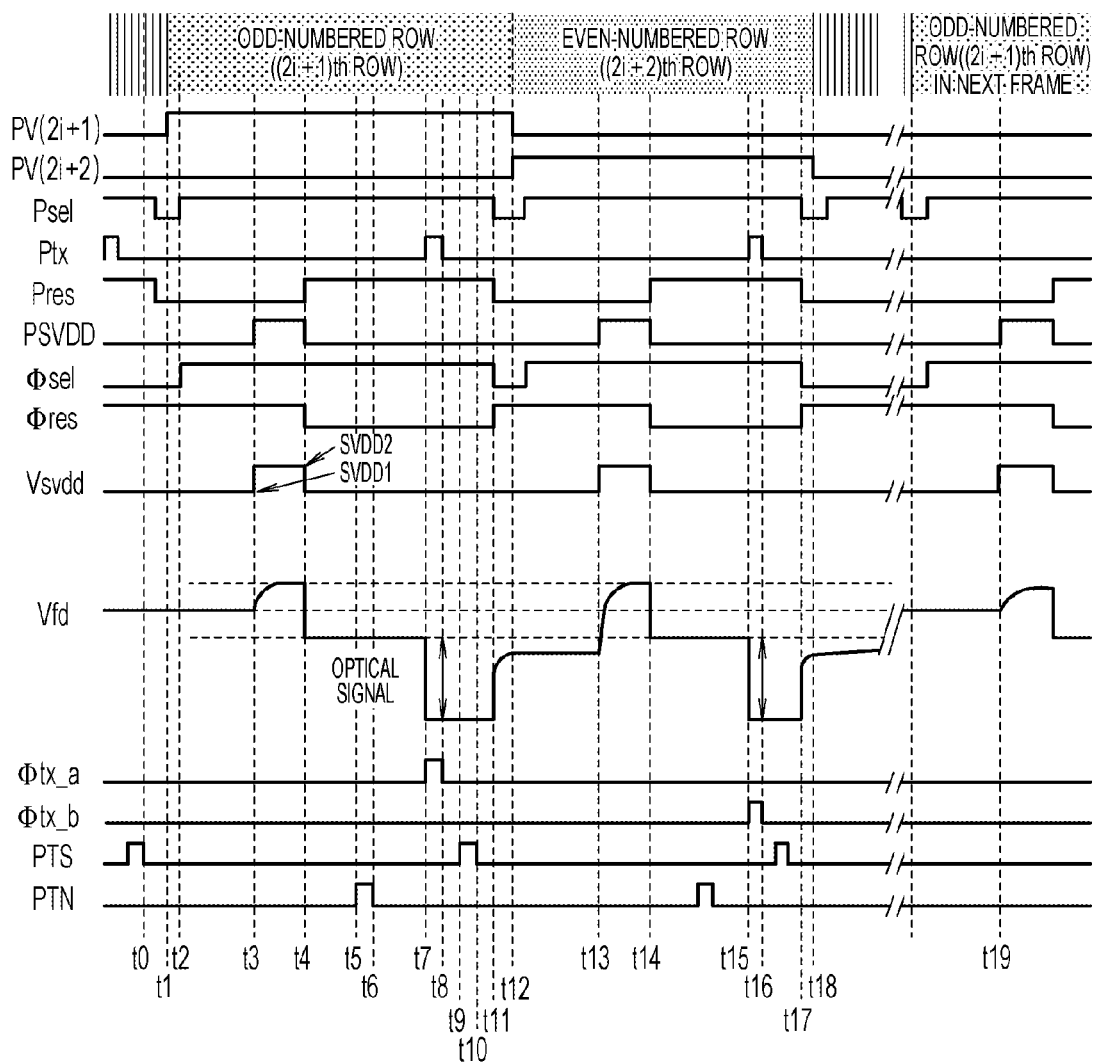
FIG. 5 is a driving timing chart associated with a solid-state image pickup apparatus according to an embodiment of the present invention.

FIG. 5 is a driving timing chart associated with the circuit shown in FIG. 4. In FIG. 5, at time t0, Φsel (driving line 111) is at the low level and the selection transistor 106 of the pixel unit 100 is in the off-state. PSVDD is at the low level and thus the potential SVDD1 is supplied as the drain potential Vsvdd to the reset transistor 105. Thus, the potential Vfd of the FD region 103 is reset to a potential nearly equal to SVDD1.

At time t1, the signal PV(2$i$+1) from the vertical shift register 202 switches to the high level and thus the driving pulse signals are enabled.

When both Psel and Φsel switch to the high level at time t2, the selection transistor 106 turns on and it is enabled to output the signal from the pixel unit 100.

When PSVDD switches to the high level at time t3, a potential SVDD2 is supplied as the drain potential Vsvdd to the reset transistor 105. Because SVDD1<SVDD2, the potential Vfd of the FD region 103 changes toward a higher value.

At time t4, Pres switches to the high level and PSVDDs switches to the low level, and thus Φres switches to the low level. As a result, the resetting of the FD region 103 is ended, which causes the FD region 103 to be brought into a state in which when the gate potential of the reset transistor 105 changes from VDD to the ground potential, the potential Vfd is swung down via capacitive coupling. At this timing, PSVDD switches to the low level and a potential corresponding to the potential Vfd is output to the vertical read line 107.

In a period from t5 to t6, PTN supplied to the column signal reading unit 203 switches to the high level at t5 and returns to the low level at t6, and in this period from t5 and t6, a dark-level signal is sampled by the column signal reading unit 203.

In a period from t7 to t8, Ptx switches to the high level at t7 and returns to the low level at t8, and, in response, the transfer transistor 102$a$ of Φtx_a turns on at t7 and turns off at t8. As a result, in this period, the optical signal in the odd-numbered row is transferred to the FD region 103, and thus the potential Vfd drops down.

In a period from t9 to t10, PTS supplied to the column signal reading unit 203 switches to the high level at t9 and returns to the low level at 10, and thus in the period a light signal is sampled by the column signal reading unit 203.

At time t11, Pres switches to the low level, and thus Φres switches to the high level. As a result, SVDD1 is supplied from the drain of the reset transistor 105 and the potential Vfd is reset to SVDD1. At time t11+Δt, i.e., immediately after time t11, the potential Vfd is given by the following equation:

$$Vfd(t11+\Delta t)=DVDD-Vth \text{ when } SVDD1>DVDD-Vth \quad (1)$$

$$Vfd(t11+\Delta t)=SVDD1 \text{ when } DVDD-Vth>SVDD1 \quad (2)$$

where Vth is a threshold voltage of the reset transistor 105. In the case of (1), a sub-threshold current of the reset transistor 105 causes the potential Vfd to gradually increase. The sub-threshold current depends on a gate-source voltage difference Vgs of the reset transistor 105 such that the sub-threshold current increases exponentially with Vgs as in the first embodiment. On the other hand, in the case of (2), SVDD1 is directly applied to Vfd, and thus, at this point of time, the voltage difference of the FD region 103 is suppressed between the even-numbered row and the odd-numbered row.

At time t12, the signal PV(2$i$+1) from the vertical shift register 202 switches to the low level and the signal PV(2$i$+2) switches to the high level. As a result, the driving pulse 109$a$ of the transfer transistor in the odd-numbered row is disabled and, instead, the driving pulse 109$b$ of the transfer transistor in the even-numbered row is enabled.

The following operation is performed in a similar manner to that performed in the period from t2 to t11, and thus the following description will focus on differences. Time t13 corresponds to time t3 for the odd-numbered row. The operation at time t13 is similar to that at time t3 in that similar driving pulses are used but the operations are different in that the potential Vfd has different values in the case of (1), as in the first embodiment.

In the present embodiment, in addition to SVDD1, SVDD2 higher than SVDD1 is provided as the drain potential to reset the FD region 103. Although the period in which SVDD1 is applied to the drain of the reset transistor 105 is different between the odd-numbered row and the even-numbered row, the period in which SVDD2 is applied to the drain of the reset transistor 105 is substantially equal for the odd-numbered row and the even-numbered row. Thus, it is possible to obtain the same potential of the FD region 103 for the odd-numbered row and the even-numbered row at a point of time (t4 or t14) at which the resetting is ended. In the example described above, there are provided two values for SVDD. Note that, alternatively, three or more values may be provided, and the period in which the resetting is performed using the highest value may be set to be equal for the plurality of photodiodes.

As described above, the reset transistor 105 sequentially supplies the plurality of drain potentials, i.e., SVDD1 and SVDD2 in the present example, thereby performing the resetting operation by sequentially using the plurality of reset voltages. Preferably, a difference is set to be greater than or equal to 100 mV between a highest potential and a next highest potential of the plurality of drain potentials (SVDD1 and SVDD2) supplied to the reset transistor 105.

As described above, in the pixel unit 100 including the FD region 103 shared by the plurality of photodiodes, two values SVDD1 and SVDD2 are provided as the drain potential of the reset transistor 105. Furthermore, the period in which SVDD2 is applied to reset the FD region 103 is set to be substantially equal for the plurality of photodiodes in the pixel unit 100 such that the potential of the FD region 103 becomes equal for the plurality of photodiodes when the resetting is complete thereby making it possible to achieve a high-quality image with no difference in output between the plurality of photodiodes in the pixel unit 100.

Third Embodiment

Figure 6:
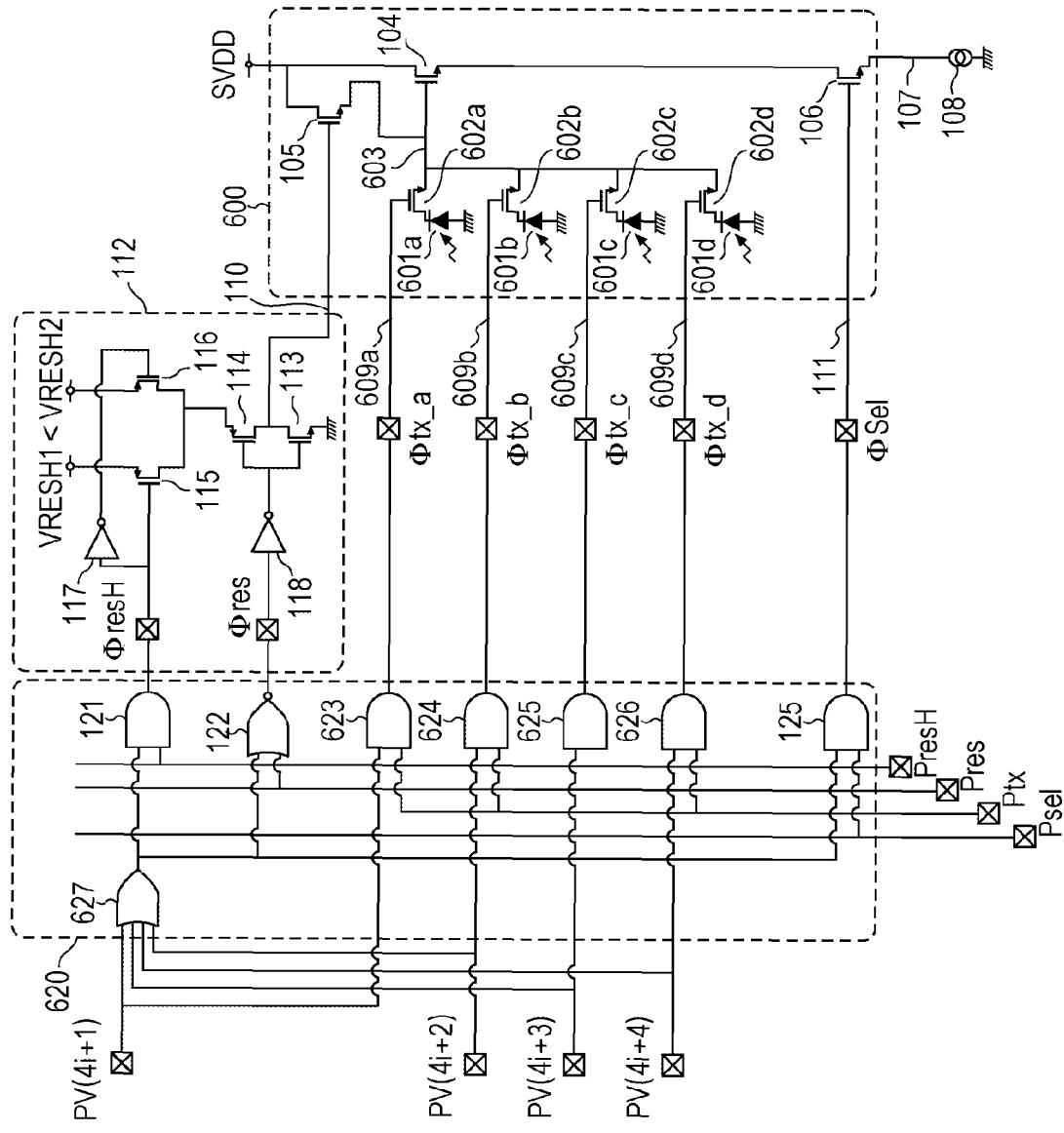
FIG. 6 illustrates a pixel circuit of a solid-state image pickup apparatus according to an embodiment of the present invention.

FIG. 6 illustrates a pixel circuit of a solid-state image pickup apparatus according to a third embodiment of the present invention. The third embodiment is different from the first embodiment in the number of photodiodes that share one FD region. That is, in the first embodiment described above, two photodiodes 101$a$ and 101$b$ share the FD region 103. In contrast, in the present embodiment, four photodiodes 601$a$ to 601$d$ share one FD region 603. In a pixel unit 600, photodiodes 601$a$, 601$b$, 601$c$, and 601$d$ are used as photoelectric conversion elements. The photoelectric conversion elements are not limited to the photodiodes, but other types of photoelectric conversion elements may be used as long as they are capable of converting incident light into an electric signal. Transfer transistors 602$a$, 602$b$, 602$c$, and 602$d$ transfer electric charges generated via the photoelectric conversion performed by the photodiodes 601a to 601d into the FD region 603. The transfer transistors 602a to 602d are driven respectively by driving lines 609a, 609b, 609c, and 609d connected to a pulse selector 620 including a 4-input OR circuit, and AND circuits 623, 624, 625, and 626. In the following description, it is assumed that the FD region 603 is shared by four photodiodes 601a to 601d, although the number of photodiodes sharing one FD region is not limited to four. In a conventional method, a resetting time necessary to reset the FD region 603 before a pixel signal is read out from a pixel in a first row in the pixel unit 600 can be different from a resetting time necessary to reset the FD region 603 before a pixel signal is read out from another pixel. In the present embodiment, as in the first embodiment, VRESH2 higher than VRESH1 is applied to the gate of the reset transistor 105 before each photodiode is read out such that a difference is suppressed between the signal output from the photodiode 601a and the signal output from another photodiode.

In skip reading, only particular photodiodes (for example, photodiodes 601a and 601c) are read out but the other photodiodes (for example, photodiodes 601b and 601d) are not read out. If skip reading is performed using the conventional method, the difference in the resetting time among photodiodes in the pixel unit 600 can be different from that according to the present embodiment described above. That is, in the conventional method, for the photodiode 601a in the first row in the pixel unit 600, the resetting of the FD region 603 is performed continuously starting at a time before the current frame starts. For the photodiode 601b in the second row, the transfer transistor 602b is maintained in the off-state so that the pixel signal is not read out, and thus the FD region 603 is maintained in the resetting state starting with one previous frame. For the photodiode 601c in the third row, after the reading out of the pixel signal from the photodiode 601a is complete, the FD region 603 is reset and the pixel signal is read out from the photodiode 601c, and thus the resetting of the FD region 603 is performed in a relatively short resetting time. For the photodiode 601d, as with the photodiode 601b, the FD region 603 is maintained in the resetting state starting with one previous frame. Thus, when the skip reading is performing using the conventional method, a difference occurs between the output from the photodiode 601c in the third row and the output from the other photodiodes.

In the present embodiment, in contrast, the difference in output among photodiodes is suppressed by applying the high potential VRESH2 to the reset transistor 105 in the resetting operation for each photodiode.

Fourth Embodiment

Figure 7:
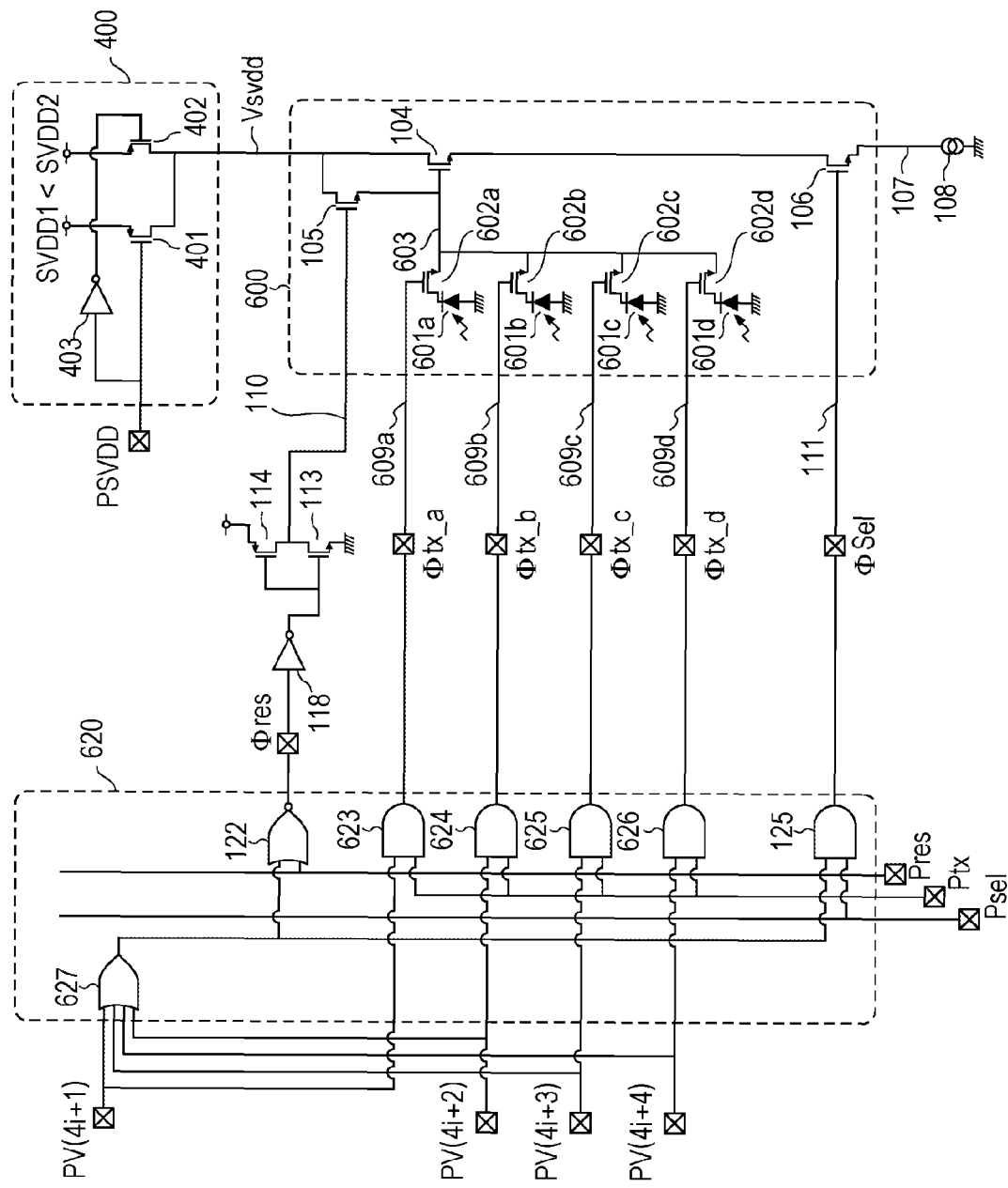
FIG. 7 illustrates a pixel circuit of a solid-state image pickup apparatus according to an embodiment of the present invention.

FIG. 7 illustrates a pixel circuit of a solid-state image pickup apparatus according to a fourth embodiment of the present invention. In the second embodiment described above, the FD region 103 is shared by the two photodiodes 101a and 101b. The fourth embodiment described below is different from the second embodiment in that one FD region 603 is shared by four photodiodes 601a to 601d. In the present embodiment in which the FD region 603 is shared by the four photodiodes 601a to 601d, as in the second embodiment, the drain potential SVDD2 higher than SVDD1 is supplied to the drain of the reset transistor 105 before the signal reading is performed for each photodiode to suppress the difference in signal output among the four photodiodes 601a to 601d.

Fifth Embodiment

Figure 8:
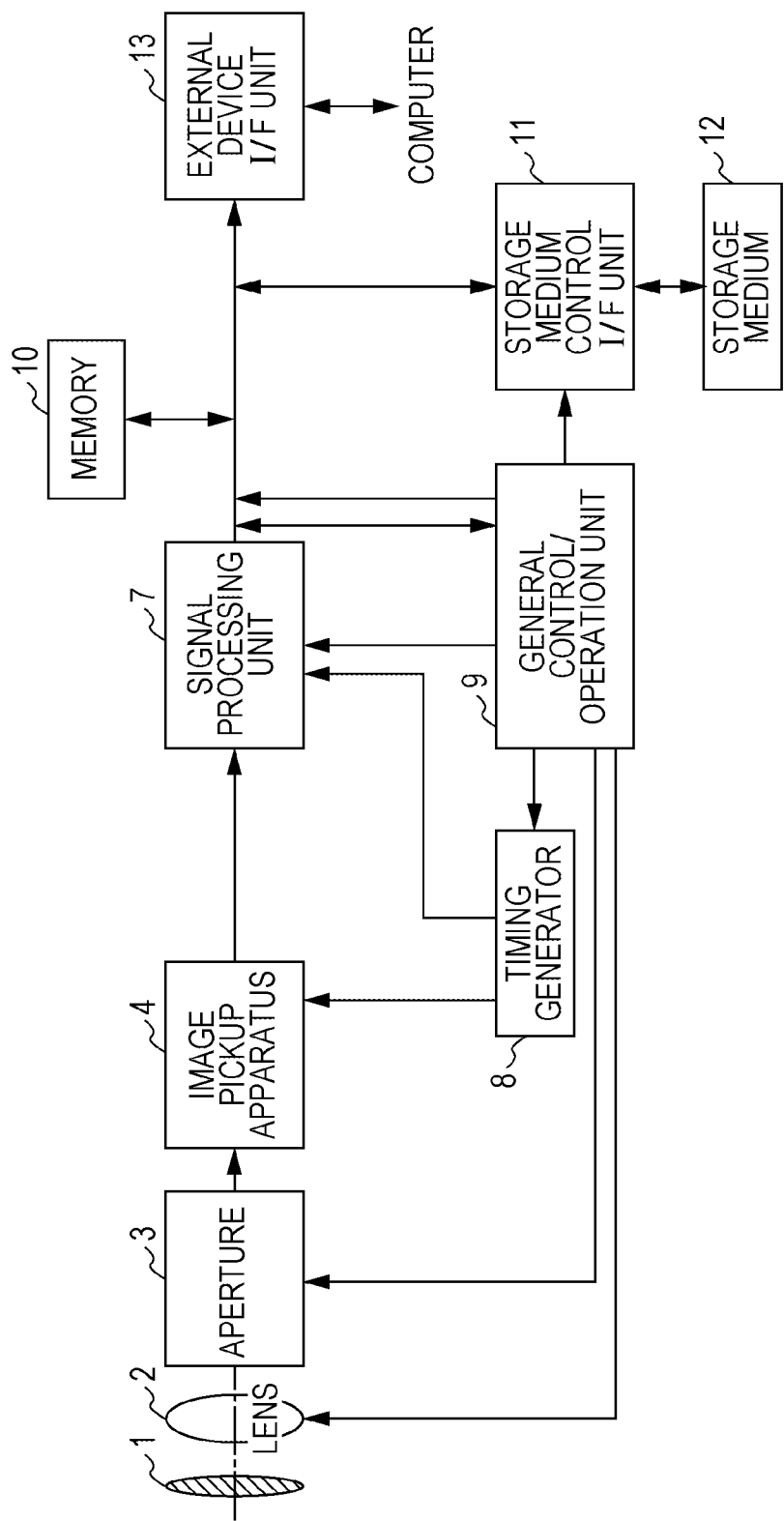
FIG. 8 is a system diagram associated with a solid-state image pickup apparatus according to an embodiment of the present invention.

The solid-state image pickup apparatus according to one of the embodiments described above may be used in an image pickup system such as a digital still camera, a digital camcorder, etc. FIG. 8 is a block diagram illustrating a digital still camera including a solid-state image pickup apparatus, which is an example of an image pickup system according to the fifth embodiment of the present invention. In FIG. 8, a barrier 1 is for protection of a lens 2. The lens 2 forms an optical image of a subject on a solid-state image pickup apparatus 4. An aperture 3 is used to adjust the amount of light after the light has passed through the lens 2. A solid-state image pickup apparatus 4 may be configured according to one of the embodiments described above such that the solid-state image pickup apparatus 4 converts the optical image formed by the lens 2 into image data. Note that the solid-state image pickup apparatus 4 is assumed to include an A/D converter formed on the same substrate on which the solid-state image pickup apparatus 4 is formed. A signal processing unit 7 performs various kinds of corrections and/or data compression on the image data output from the solid-state image pickup apparatus 4. A timing generator 8 outputs various timing signals to the solid-state image pickup apparatus 4 and the signal processing unit 7. A general control/operation unit 9 performs various calculations and controls the whole digital still camera. A memory 10 temporarily stores the image data. Data is read or stored from or into a removable storage medium 12 such as a semiconductor memory via an interface unit 11. An external device interface unit 13 is an interface with an external device such as a computer. The timing signals may be supplied from the outside of the image pickup system. The image pickup system may include at least the solid-state image pickup apparatus 4 and the signal processing unit 7 that processes the image signal output from the solid-state image pickup apparatus 4. In the present embodiment, it is assumed by way of example that the solid-state image pickup apparatus 4 and the A/D converter are formed on the single substrate as described above. Alternatively, the solid-state image pickup apparatus 4 and the A/D converter may be provided separately on different substrates. In an alternative embodiment, the solid-state image pickup apparatus 4 and the signal processing unit 7 may be formed on a single substrate.

As described above, the solid-state image pickup apparatus according to one of the embodiments described above may be applied to an image pickup system. Applying the solid-state image pickup apparatus according to one of the embodiments to the image pickup system makes it possible to take a high-quality image with good linearity and low noise.

In the embodiments described above, it is assumed by way of example that transistors forming each pixel unit are of the NMOS type. Alternatively, PMOS transistors may be used for all or part of transistors in each pixel unit. In this case, signal charges may be either holes or electrons. In the case where holes are employed as the signal charges, all transistors in each pixel unit may be PMOS transistors, which can all be formed in N-type wells. This allows a reduction in element size. On the other hand, in the case where electrons are used as the signal charges, the amplification MOS transistor may be realized using a PMOS transistor formed in an N-type well. In this case, the transfer transistor may be formed in a P-type well. To reduce the pixel unit size, a back-illuminated structure may be used such that a circuit at a stage following the floating diffusion is formed on a substrate different from a substrate on which photoelectric conversion elements are formed.

In the embodiments described above, resetting is performed using a plurality of reset voltages in both the first and second reset periods. Alternatively, a plurality of reset voltages may be used at least in the first reset period, while the resetting in the second reset period may be performed using at least a highest reset voltage of the plurality of reset voltages. Note that also in this case, the total length is necessary to be different between the first and second reset periods.

Note that the embodiments are described by way of examples and not limitation. Various modifications, changes, substitutions, or the like may be possible without departing from the spirit and scope of the invention. For example, the embodiments in which electrons are used as signal charges may be modified such that holes are used as signal charges. In this case, the reset voltages may be set inversely in terms of voltage level. That is, the length of the resetting period in which the lowest resetting voltage is used may be set to be equal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192439 filed Aug. 30, 2010, which is hereby incorporated by reference herein in its entirety.

What is claimed is:

1. A solid-state image pickup apparatus comprising:
a first conversion element configured to generate a first electron by photoelectric conversion;
a second conversion element configured to generate a second electron by photoelectric conversion;
a floating node for common use;
a first transistor configured to transfer the first electron to the floating node;
a second transistor configured to transfer the second electron to the floating node; and
a reset transistor configured to reset the electron on the floating node,
the solid-state image pickup apparatus having:
a first reset period in which the electron on the floating node is reset sequentially by a plurality of reset voltages before the first electron is transferred to the floating node; and
a second reset period in which the electron on the floating node is reset by a first reset voltage after the first electron is transferred to the floating node and before the second electron is transferred to the floating node,
wherein the first reset period and the second reset period are different in length,
and wherein the first reset period includes a first sub-period in which resetting is performed by a highest reset voltage of the plurality of reset voltages, and the second reset period includes a second sub-period in which resetting is performed by the first reset voltage, wherein these two sub-periods are substantially equal in length.

2. The solid-state image pickup apparatus according to claim 1, wherein the second reset period further includes a third sub-period in which the floating node is reset by a second reset voltage lower than the first reset voltage.

3. The solid-state image pickup apparatus according to claim 1, wherein a plurality of gate voltages are sequentially applied to a gate of the reset transistor thereby resetting the floating node by a sequence of plurality of reset voltages.

4. The solid-state image pickup apparatus according to claim 1, wherein a plurality of drain voltages are sequentially applied to a drain of the reset transistor thereby resetting the floating node by a sequence of plurality of reset voltages.

5. The solid-state image pickup apparatus according to claim 1, wherein a difference in length is less than or equal to 100 ns between the sub-periods, in the first reset period, in which resetting is performed by the highest reset voltage of the plurality of reset voltages and the sub-period, in the second reset period, in which resetting is performed by the highest reset voltage.

6. The solid-state image pickup apparatus according to claim 1, wherein a difference in length is within a range from 10 ns to 10 μs between the sub-periods, in the first reset period, in which resetting is performed by the highest reset voltage of the plurality of reset voltages and the sub-period, in the second reset period, in which resetting is performed by the highest reset voltage.

7. The solid-state image pickup apparatus according to claim 3, wherein a highest voltage of the plurality of gate voltages supplied to the reset transistor is different by 100 mV or greater from a next highest voltage.

8. The solid-state image pickup apparatus according to claim 4, wherein a highest voltage of the plurality of drain potentials supplied to the reset transistor is different by 100 mV or greater from a next highest potential.

9. A solid-state image pickup apparatus comprising:
a first conversion element configured to generate a first hole by photoelectric conversion;
a second conversion element configured to generate a second hole by photoelectric conversion;
a floating node for common use;
a first transistor configured to transfer the first hole to the floating node;
a second transistor configured to transfer the second hole to the floating node;
a reset transistor configured to reset the hole on the floating node,
the solid-state image pickup apparatus having:
a first reset period in which the hole on the floating node is reset sequentially by a plurality of reset voltages before the first hole is transferred to the floating node; and
a second reset period in which the hole on the floating node is reset by a first reset voltage after the first hole is transferred to the floating node and before the second hole is transferred to the floating node,
wherein the first reset period and the second reset period are different in length,
and wherein the first reset period includes a first sub-period in which resetting is performed by a lowest reset voltage of the plurality of reset voltages, and the second reset period includes a second sub-period in which resetting is performed by the first reset voltage, wherein these two sub-periods are substantially equal in length.

10. The solid-state image pickup apparatus according to claim 9, wherein the second reset period further includes a third sub-period in which the floating node is reset by a second reset voltage higher than the first reset voltage.

11. The solid-state image pickup apparatus according to claim 9, wherein a plurality of gate voltages are sequentially applied to a gate of the reset transistor thereby resetting the floating node by a sequence of plurality of reset voltages.

12. The solid-state image pickup apparatus according to claim 9, wherein a plurality of drain voltages are sequentially applied to a drain of the reset transistor thereby resetting the floating node by a sequence of plurality of reset voltages.

13. An image pickup system comprising:
the solid-state image pickup apparatus according to claim 1; and
a lens that forms an optical image on the solid-state image pickup apparatus.

14. The image pickup system according to claim 13, wherein a plurality of gate voltages of the solid-state image pickup apparatus are sequentially applied to a gate of the reset transistor thereby resetting the floating node by a sequence of plurality of reset voltages.

15. The image pickup system according to claim 13, wherein a plurality of drain voltages of the solid-state image pickup apparatus are sequentially applied to a drain of the reset transistor thereby resetting the floating node by a sequence of plurality of reset voltages.

16. An image pickup system comprising:
the solid-state image pickup apparatus according to claim 9; and
a lens that forms an optical image on the solid-state image pickup apparatus.

17. The image pickup system according to claim 16, wherein a plurality of gate voltages of the solid-state image pickup apparatus are sequentially applied to a gate of the reset transistor thereby resetting the floating node by a sequence of plurality of reset voltages.

18. The image pickup system according to claim 16, wherein a plurality of drain voltages of the solid-state image pickup apparatus are sequentially applied to a drain of the reset transistor thereby resetting the floating node by a sequence of plurality of reset voltages.

19. A method of driving a solid-state image pickup apparatus including a first conversion element configured to generate a first electron by photoelectric conversion, a second conversion element configured to generate a second electron by photoelectric conversion, a floating node for common use, a first transistor configured to transfer the first electron to the floating node, a second transistor configured to transfer the second electron to the floating node, and a reset transistor configured to reset the electron on the floating node, the method comprising:
performing a first resetting operation such that the electron on the floating node is reset sequentially by a plurality of reset voltages before the first electron is transferred to the floating node; and
performing a second resetting operation such that the electron on the floating node is reset by a first reset voltage after the first electron in the first conversion element is transferred to the floating node and before the second electron is transferred to the floating node,
wherein a first period in which the first resetting operation is performed is different in length from a second period in which the second resetting operation is performed,
and wherein the first period includes a first sub-period in which resetting is performed by a highest reset voltage of the plurality of reset voltages, and the second period includes a second sub-period in which resetting is performed by the first reset voltage, wherein these two sub-periods are substantially equal in length.

20. A method of driving a solid-state image pickup apparatus including a first conversion element configured to generate a first hole by photoelectric conversion, a second conversion element configured to generate a second hole by photoelectric conversion, a floating node for common use, a first transistor configured to transfer the first hole to the floating node, a second transistor configured to transfer the second hole to the floating node, and a reset transistor configured to reset the hole on the floating node, the method comprising:
performing a first resetting operation such that the hole on the floating node is reset sequentially by a plurality of reset voltages before the first hole is transferred to the floating node; and
performing a second resetting operation such that the second hole on the floating node is reset by a first reset voltage after the first hole is transferred to the floating node and before the second hole is transferred to the floating node,
wherein a first period in which the first resetting operation is performed is different in length from a second period in which the second resetting operation is performed,
and wherein the first period includes a first sub-period in which resetting is performed by a lowest reset voltage of the plurality of reset voltages, and the second period includes a second sub-period in which resetting is performed by the first reset voltage, wherein these two sub-periods are substantially equal in length.

* * * * *